(12) United States Patent
Niktash et al.

(10) Patent No.: US 8,604,911 B2
(45) Date of Patent: Dec. 10, 2013

(54) SIGNAL POWER MAPPING FOR DETECTION OF BURIED OBJECTS AND OTHER CHANGES TO THE RF ENVIRONMENT

(75) Inventors: Afshin Niktash, Irvine, CA (US); Farrokh Mohamadi, Irvine, CA (US)

(73) Assignee: Tialinx, Inc., Irvine, CA (US)

( * ) Notice: Subject to any disclaimer, the term of this patent is extended or adjusted under 35 U.S.C. 154(b) by 728 days.

(21) Appl. No.: 12/253,923

(22) Filed: Oct. 17, 2008

(65) Prior Publication Data

US 2010/0097182 A1    Apr. 22, 2010

(51) Int. Cl.
*H04Q 5/22*    (2006.01)
*G08B 21/00*    (2006.01)

(52) U.S. Cl.
USPC ..... 340/10.1; 340/540; 340/500; 340/539.22; 340/539.21

(58) Field of Classification Search
USPC ............... 340/10.1, 540, 500, 539.22, 539.21
See application file for complete search history.

(56) References Cited

U.S. PATENT DOCUMENTS

| | | | |
|---|---|---|---|
| 6,870,370 B2* | 3/2005 | Bryan | 324/331 |
| 6,925,755 B1* | 8/2005 | Kyrtsos | 49/26 |
| 7,876,224 B2* | 1/2011 | Prokopuk | 340/572.1 |
| 7,969,295 B2* | 6/2011 | Colvero et al. | 340/505 |
| 2003/0193429 A1* | 10/2003 | Campana et al. | 342/22 |
| 2004/0183680 A1* | 9/2004 | Thompson et al. | 340/572.4 |
| 2004/0212500 A1* | 10/2004 | Stilp | 340/541 |
| 2005/0024210 A1* | 2/2005 | Maki | 340/566 |
| 2007/0008121 A1* | 1/2007 | Hart | 340/540 |
| 2007/0022457 A1* | 1/2007 | Eckenroth et al. | 725/107 |
| 2007/0039745 A1* | 2/2007 | Anderson et al. | 172/6 |
| 2007/0082677 A1* | 4/2007 | Donald Hart et al. | 455/456.1 |
| 2009/0051568 A1* | 2/2009 | Corry et al. | 340/935 |
| 2010/0090802 A1* | 4/2010 | Nilsson et al. | 340/10.1 |

* cited by examiner

*Primary Examiner* — Daniel Wu
*Assistant Examiner* — Kam Ma
(74) *Attorney, Agent, or Firm* — Haynes and Boone, LLP (57) ABSTRACT

In one embodiment, an RF disturbance detection system is provided that includes:
an RF interrogator configured to transmit an RF interrogation signal; and
a plurality of RF transceiver modules configured to respond to the RF interrogation signal by transmitting unique RF response signals, wherein the RF interrogator is further configured to periodically interrogate the RF transceiver modules to detect the power of the corresponding response signals so as to detect any changes in the response signal powers over time.

7 Claims, 7 Drawing Sheets

SIGNAL POWER MAPPING FOR DETECTION OF BURIED OBJECTS AND OTHER CHANGES TO THE RF ENVIRONMENT

TECHNICAL FIELD

This application relates to radar and more particularly to the use of signal power mapping for radar imaging.

BACKGROUND

One of the most desired critical and life-saving technologies in combat zones and field operations is reliable detection of on-road or off-road Improvised Explosive Devices (IEDs), Explosively Formed Penetrators (EFPs) and hidden weapon caches. IEDs, roadside bombs, and suicide car bombs, have caused over 60% of all American combat casualties in Iraq and 50% of combat casualties in Afghanistan. To combat such threats, a widespread video surveillance system could be used. However, the required infrastructure and the large installation costs of such a massive video surveillance system in the typically remote and underdeveloped areas subject to combat has prevented any widescale implementation of such systems. In contrast, RF sensing technology has the potential to defeat the IED threat by monitor movements and disturbances to areas of suspected IED activity. While optical surveillance systems fail to effectively operate in darkness or harsh weather conditions, RF sensors have the benefit of all-weather day and night operation.

The application of RF technology for detection of buried targets will typically use an RF transmitter that sends electromagnetic pulses to the area under interrogation and a sensitive receiver to collect the reflections. The amplitude and phase information in the reflected signal is extracted and processed in real-time or offline to determine the signature of a suspicious target. Although advanced imaging radars have been developed to detect and image buried or hidden-behind-wall targets, such radars will generally need to be scanned across the area of interest to image their targets and can be relatively expensive due to their sophisticated signal processing.

Accordingly, there is a need in the art for low-cost RF-based systems that can detect threats such as IEDs.

SUMMARY

In accordance with an aspect of the invention, an RF disturbance detection system is provided that includes: an RF interrogator configured to transmit an RF interrogation signal; and a plurality of RF transceiver modules configured to respond to the RF interrogation signal by transmitting unique RF response signals, wherein the RF interrogator is further configured to periodically interrogate the RF transceiver modules to detect the power of the corresponding response signals so as to detect any changes in the response signal powers over time.

In accordance with another aspect of the invention, a method of detecting disturbances is provided that includes: distributing a plurality of RF transceiver modules in a monitored area, wherein each RF transceiver module is configured to transmit a unique response signal in response to an interrogation; interrogating the plurality of RF transceiver modules at a first time; receiving the unique response signals at a reception point to determine power levels for the received response signals at the first time; interrogating the plurality of RF transceiver modules at a subsequent second time; receiving the unique response signals at the reception point to determine power levels for the received response signals at the second time; and comparing the power levels from the first and second times to detect a presence of an RF disturbance in the monitored area.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

To provide a low-cost yet effective RF-based system to detect IEDs or other disturbances, a distributed network is disclosed that includes an RF interrogator and a plurality of transceiver nodes to monitor an area of interest by comparing received power levels from the distributed modules to a previously-established monitoring clear area signature. Because of the plural modules, the system is configured as a multi-static radar. In one embodiment, the network may include a number of clusters, each comprised of an RF interrogator and plural transceiver nodes.

Figure 1:
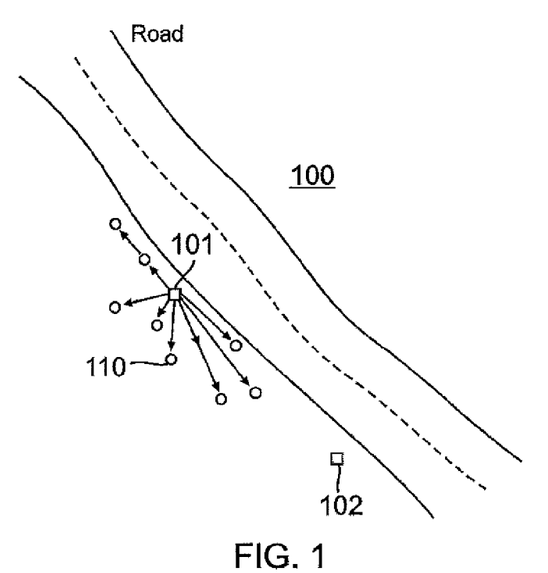
FIG. 1 illustrates an example IED detection system.

Turning now to the drawings, FIG. 1 illustrates a radar system 100 including an RF interrogator 101 and a number of transceivers modules 110. Both the interrogator and the transceiver modules are planted on the ground surface. Alternatively, the interrogator may be in an elevated position such as through a mounting to a telephone pole or other suitable structure. The interrogator generates an interrogation signal such as RF pulses that are detectable by the transceivers. Because the interrogator interrogates all the transceivers within its cluster, an antenna beam for a transmitting antenna of the interrogator should be wide enough to cover the cluster area. For this purpose, an omnidirectional antenna or a multi-sector array may be implemented. Each transceiver responds to the interrogating signal by transmitting a response signal. For example, the interrogator may comprise a radio-frequency identification (RFID) reader. The transceivers would thus comprise either passive or active RFID tags. Passive tags have the advantage of being quite inexpensive but are limited in range in that they must respond using solely the received power from the RFID reader. Active tags have a power supply so they may be located at farther ranges from the RFID reader but are more expensive than passive tags. Regardless of whether the tags are active or passive, they may be quite small and thus placed unobtrusively across a cluster area that will be monitored by the RFID reader. Because each tag has a unique ID, the RFID reader may interrogate each tag individually to avoid any communication collisions. Alternatively, the RF interrogator may comprise a WiFi access point (AP) such that the transceivers would be client devices on a wireless IEEE 802.11 network. It will be appreciated that numerous other protocols may be used so long as the interrogator may request some type of response signal from the transceivers.

The RF interrogator analyzes the response signals transmitted by the transceivers to determine their signal powers. For example, the response signals as received by the RF interrogator may be analyzed for their signal-to-noise ratio (SNR). The signal power and SNR for the various response signals generated by the transceivers is affected by the range and RF environment with regard to the RF propagation path between the interrogator and the transceivers. Any change to the cluster scene or disturbance to the ground that obstructs or changes the RF environment in the RF propagation path between the interrogator and the transceiver modules results in variations in the power level and/or SNR for the response signals received by the RF interrogator. In that regard, an RF interrogator may determine a baseline power level or SNR level for the various transceivers within its cluster upon placement of the transceivers across a desired area to be monitored. A cluster map of SNR values or received power levels for the received response signals from the transceiver modules represents the current setting of a scene. If SNR is used to characterize the received response signals, the resulting initial SNR levels for the various transceiver modules may be referred to an SNR map. Temporary changes to the SNR map indicate suspicious activities such as vehicle stops. Long-term variations in the SNR map may be further investigated as an indication of ground disturbances due to a possible buried IED. If multiple clusters of transceivers are used, a global SNR map may be used to record the initial conditions across the clusters. Changes across the global SNR map may be used to track an offending vehicle or dismount.

To accomplish a higher probability of detection of threats such as IED with a reduced false alarm rate, the SNR map resolution may be enhanced by increasing the density of transceiver modules across the area being monitored. In this fashion, the spatial density of the transceiver modules may be elevated in areas of higher risk. In addition, a cluster may be monitored by more than one RF interrogator such as through the inclusion of an RF interrogator 102 as shown in FIG. 1. In this scenario, each transceiver module will receive interrogation signals from multiple RF interrogators with corresponding different orientations, which results in further increase in coverage area.

The SNR map methodology (or other suitable mapping of received response signal strength) enables detection of suspicious activities and disturbance to the ground. Through the use of low-cost solutions such as RFID, a user enjoys a rapid installation of the IED monitoring system, a low bandwidth requirement for the interrogating signals as well as the response signals, and a modular and scalable configuration with flexible placement of the various transceiver modules.

The location and configuration of the RF interrogator should be such that the interrogating signals carry enough power to be picked up at all the transceiver modules within the corresponding cluster. By increasing the transmitter power for the RF interrogator, the interrogator may service a larger area with a greater number of transceiver modules. However, supplying the required energy to a relatively-high-power RF interrogator in remote and urban deployments may be challenging such that any achieved power reduction for the RF interrogator may be advantageous. Higher effective power for both the interrogating signal and the response signals may be achieved through an appropriate coding such as a Barker coding. For example, a 13 tap Barker code improves received SNR by 22 dB as compared to the transmit power for the encoded signal. In addition to coding for signal power gain, uniquely coding the interrogating signal for each RF interrogator with a pseudo-random noise code provides another way for the transceiver nodes to differentiate between interrogators in a multi-interrogator system.

The more often an RF interrogator interrogates the transceiver modules within its cluster, the greater the temporal resolution of the resulting SNR map. However, it will be appreciated that each interrogation/response cycle demands power such that the temporal resolution must be balanced against available power supplies such as batteries for the RF interrogator and any active transceiver modules.

As discussed above, the SNR map is a collection of received response signal strength for the various transceiver modules within a cluster. The distribution of transceiver modules within a cluster is arbitrary. However the topology of the network and location of sensors minimizes the number of required sensors for a given resolution. In order to increase the resolution, the number of transceiver modules should increase. Since the network is modular and scalable, sensors can be added to the network incrementally to enhance the coverage and resolution.

SNR Map Simulation

Figure 2:
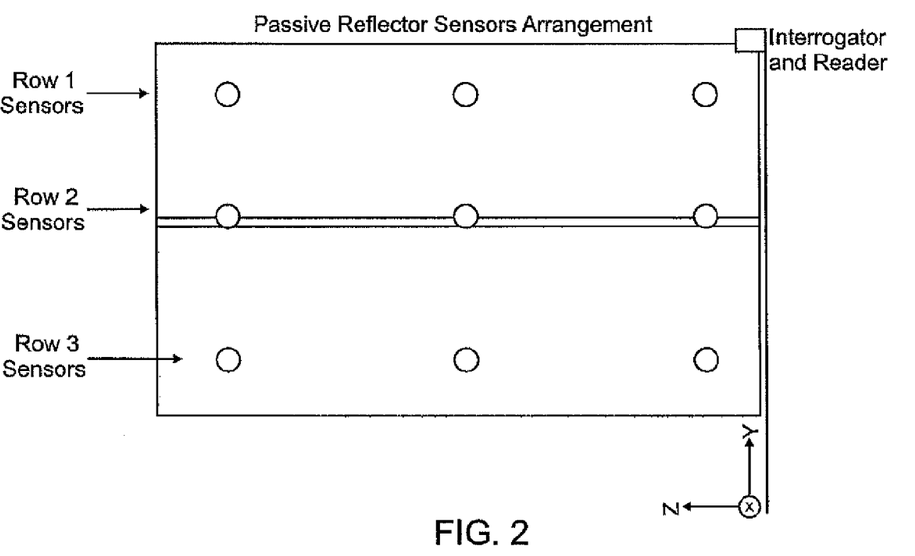
FIG. 2 illustrates an RF interrogator and corresponding RF transceiver modules arranged in rows 1 through 3.
Figure 3A:
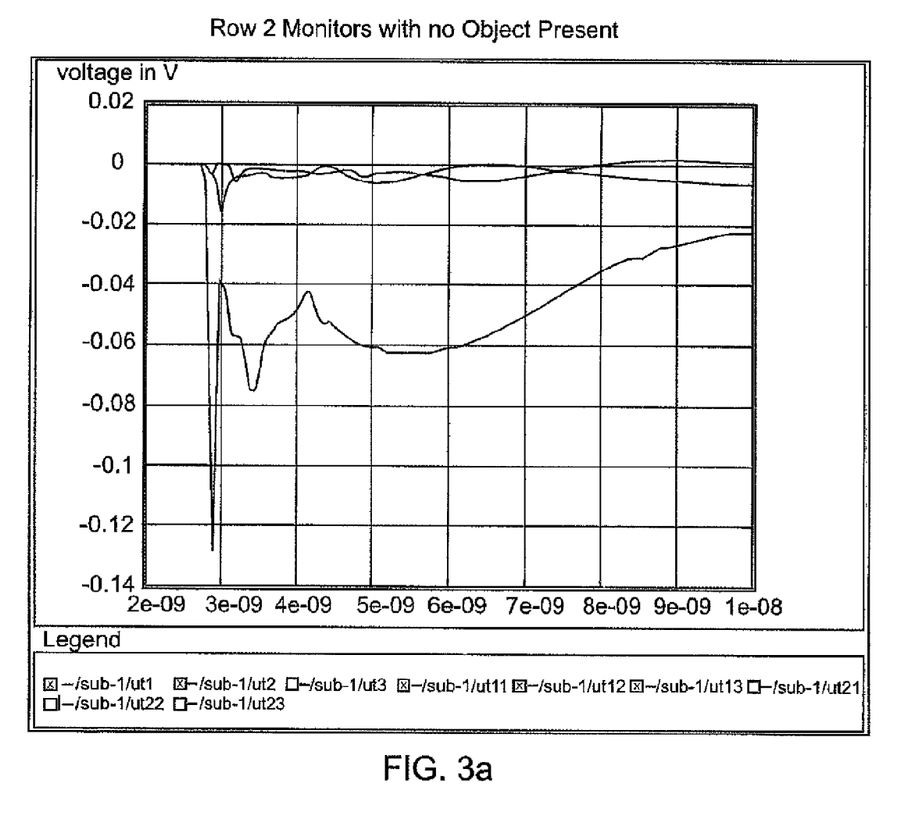
FIG. 3a illustrates the unobstructed received signal voltages for the RF transceiver modules in row 2.
Figure 3B:
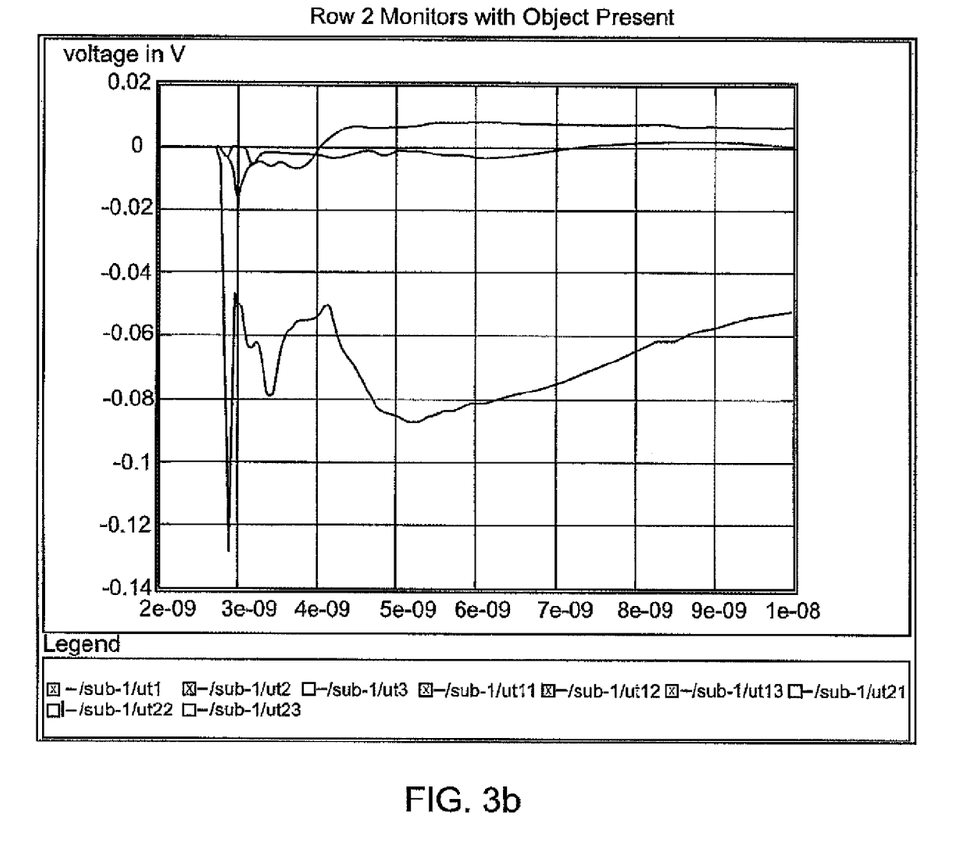
FIG. 3b illustrates the obstructed received signal voltages for the RF transceiver modules in row 2.
Figure 4A:
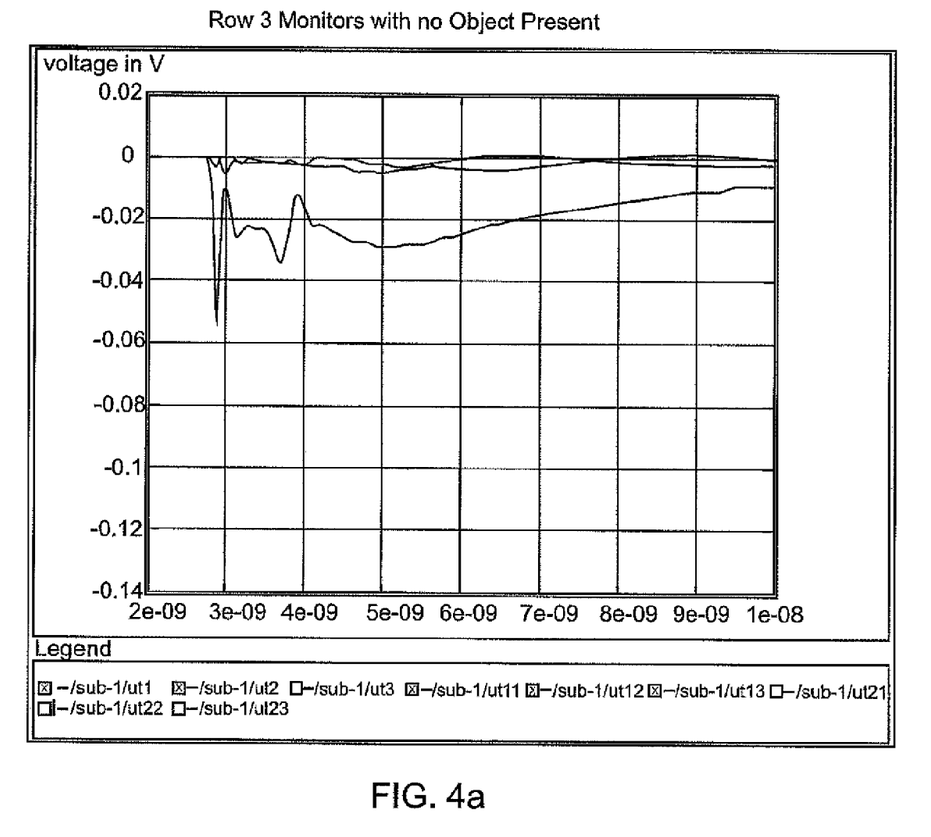
FIG. 4a illustrates the unobstructed received signal voltages for the RF transceiver modules in row 3.
Figure 4B:
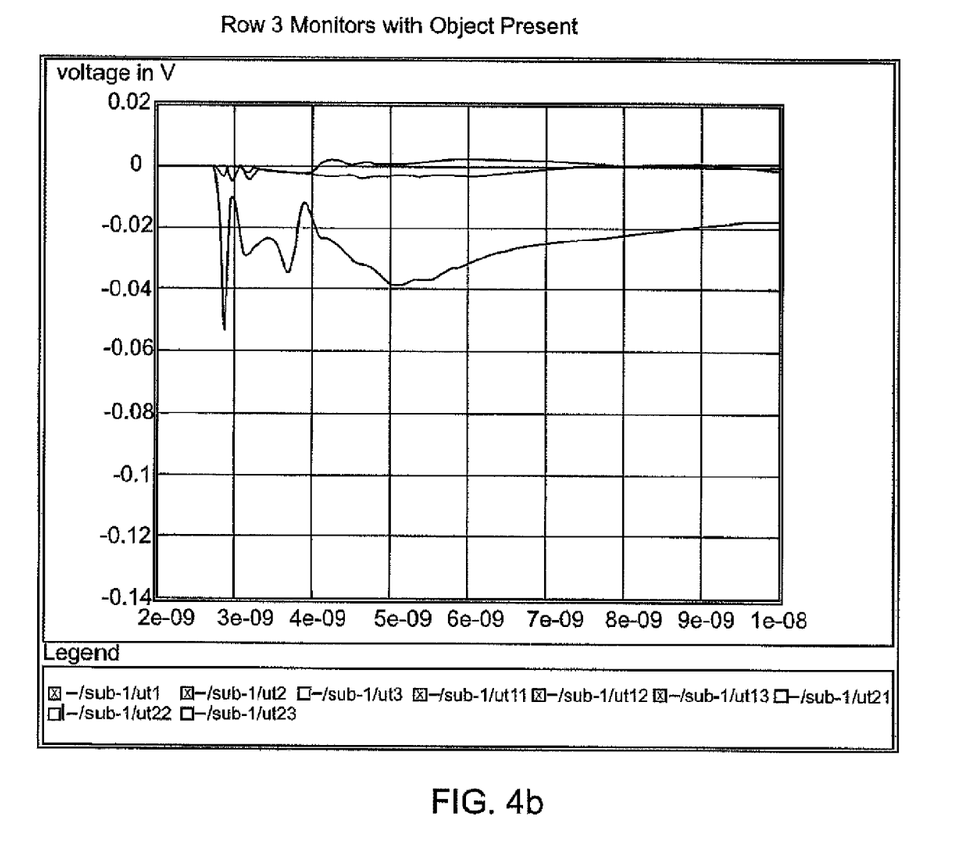
FIG. 4b illustrates the obstructed received signal voltages for the RF transceiver modules in row 3.

A series of simulations were conducted using a three-dimensional Finite Difference Time Domain (FDTD) method to examine the propagation of waveforms and variations at receiver sites in the presence of a blocking object. In this simulation, the effect of a blocking object with regard to the received interrogating signal SNR within each transceiver module is estimated. It will be appreciated that due to electromagnetic reciprocity effects, a similar SNR variation would be experienced by the RF interrogator with respect to the received response signal strengths. FIG. 2 illustrates a simulated cluster with 9 transceiver modules arranged in 3 rows with respect to an RF interrogators installed on a pole 6 feet above the ground. Each row is 805 mm in length and the rows are separated by 86 mm (the row length and separation being kept comparatively short so as to keep the simulation processing time tractable). The RF interrogator includes a patch antenna excited by a Gaussian pulse that is not coded. At each transceiver module, the received signal is captured for analysis. To keep the simulation analysis tractable, the recorded signals in the transceiver modules are raw in that these signals are neither correlated nor integrated. Because the line-of-sight to the RF interrogator is unchanged with respect to the transceiver modules in row 1, the SNR for these modules is not effectively changed with the presence of the blocking object. However as seen by comparing the unobstructed received signal voltages for the row 2 transceiver module in FIG. 3a with the corresponding obstructed signal voltages in FIG. 3b, an SNR map for these transceivers would detect the presence of the obstructing object. Similarly, a comparison of unobstructed received signal voltages in FIG. 4a for the row 3 transceiver modules with the corresponding obstructed signal voltages in FIG. 4b also indicates the presence of the blocking object. By monitoring the change in received signal strength at each transceiver module, the proximity of the obstructing object can be determined.

Should the SNR map indicate the presence of a threat such as a potential IED or vehicle stop, additional imaging of the cluster area may be performed such as through RF tomography to identify whether an IED or other threat actually exists. But the detection of a potential threat is advantageously provided using a relatively low-cost solution such as an RFID reader and corresponding tags distributed across an area to be monitored.

Figures 5A, 5B, 5C:
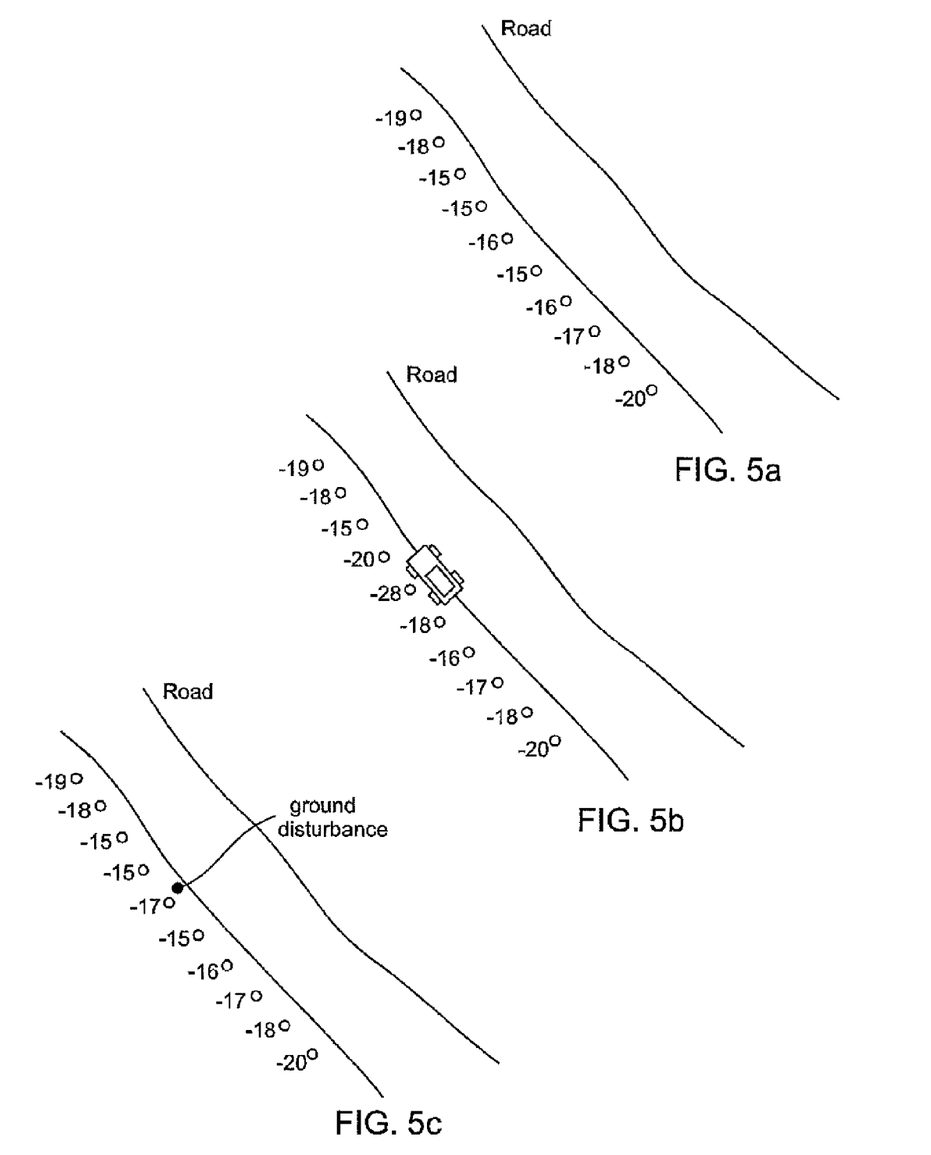
FIG. 5a illustrates a default SNR map for an IED detection system.
FIG. 5b illustrates the temporary change in the SNR map of FIG. 5a resulting from a vehicle stop.
FIG. 5c illustrates the permanent change in the SNR map of FIG. 5a resulting from a ground disturbance.

Turning now to FIG. 5a, a default SNR map in decibels (dB) is illustrated for an array of transceiver modules arranged along a road. An RF interrogator (not illustrated) has interrogated the transceiver modules to establish an SNR for the resulting response signals from the transceiver modules. The various SNRs will depend upon the range of the corresponding transceiver module from the interrogator and other factors. These SNRs will remain largely static but will change if temporary or permanent obstructions result between the transceiver modules and the RF interrogator. For example, as seen in FIG. 5b, a vehicle parked by the side of the road will cause the SNRs corresponding to several RF transceivers to weaken. In this fashion, an alert could be generated regarding a suspicious vehicle stop. Similarly, as seen in FIG. 5c, if the vehicle stop resulted in an IED implant, a permanent SNR change may be observed for an adjacent RF transceiver (an SNR of −16 dB changing to −17 dB).

Figure 6:
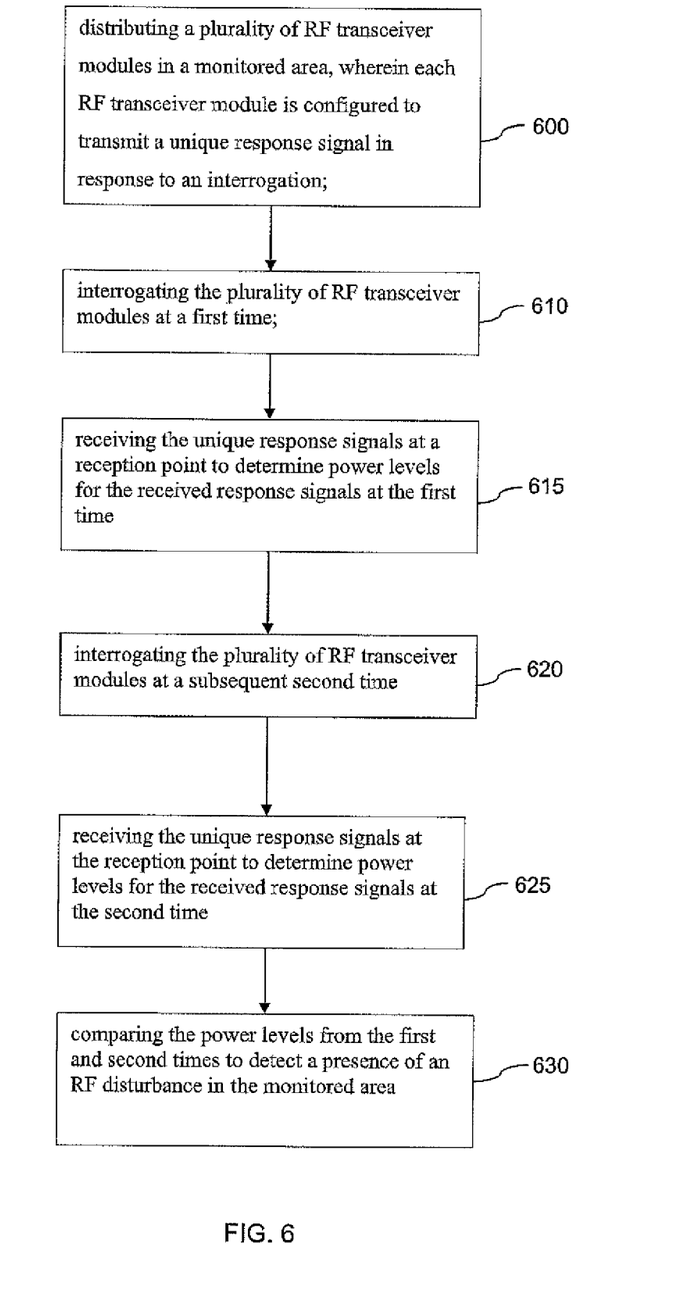
FIG. 6 shows a flowchart for an example method of detecting disturbances.

A method of detecting disturbances according to an embodiment of the invention may be better understood with reference to FIG. 6. The method begins with a step 600 of distributing a plurality of RF transceiver modules in a monitored area, wherein each RF transceiver module is configured to transmit a unique response signal in response to an interrogation. The method continues with a step 610 of interrogating the plurality of RF transceiver modules at a first time as well as a step 615 of receiving the unique response signals at a reception point to determine power levels for the received response signals at the first time. Given this signal reception and power determination, the method continues with a step 620 of interrogating the plurality of RF transceiver modules at a subsequent second time followed by a step 625 of receiving the unique response signals at the reception point to determine power levels for the received response signals at the second time. A detection step 630 thus comprises comparing the power levels from the first and second times to detect a presence of an RF disturbance in the monitored area.

It will be appreciated that the signal power mapping techniques discussed herein may be widely applied to any suitable RF interrogator/transceiver module system. All that is needed is an RF protocol such as RFID or 802.11 that allows the RF interrogator to individually recognize the response signals from the various transceiver modules. In addition, if multiple interrogators are interrogating a cluster, the RF interrogators may be identified to prevent collisions between competing RF interrogations. Moreover, although the systems disclosed herein were described with respect to IED detection applications, it will be appreciated that these systems may be used to detect the presence of any change to the RF environment such as weather-related changes or other effects. In that regard, the above-described embodiments are merely meant to be illustrative and are not limiting. It will thus be obvious to those skilled in the art that various changes and modifications may be made to these embodiments. The appended claims encompass all such changes and modifications as fall within the true spirit and scope of this invention.

We claim:

1. An RF disturbance detection system, comprising:
    an RFID reader configured to transmit an RFID interrogation signal; and
    a plurality of RFID tags configured to be distributed on a ground surface and to respond to the RF interrogation signal by transmitting RFID response signals, each response signal being a constant unique code to identify its RFID tag, wherein the RFID reader is further configured to periodically interrogate the RFID tags to detect a power of the corresponding response signals so as to determine a baseline response power level for each RFID tag and to detect, for each RFID tag, any changes in the response signal powers over time with regard to its baseline power level that result from explosive devices buried below the ground surface.

2. The RF disturbance detection system of claim 1, wherein the RFID tags are passive RFID tags.

3. The RF disturbance detection system of claim 1, wherein the RFID tags are active RFID tags.

4. A method of detecting disturbances, comprising:
    distributing a plurality of RFID tags on a ground surface in a monitored area, wherein each RFID tag is configured to transmit a constant unique code in response to an interrogation;
    interrogating the plurality of RFID tags at a first time;
    in response to the interrogation at the first time receiving only the unique codes at a reception point to determine, for each RFID tag, a baseline response power level for its received unique code at the first time;
    interrogating the plurality of RFID tags at a subsequent second time;
    in response to the interrogation at the second time, receiving the unique codes at the reception point to determine, for each RFID tag, a response power level for its received unique code at the second time; and
    comparing the response power levels to the baseline response power levels to detect a presence of an RF disturbance in the monitored area from the burial of explosive devices below the ground surface.

5. The method of claim 4, wherein comparing the power levels comprises comparing signal-to-noise ratios (SNRs).

6. The method of claim 4, further comprising continuing to monitor power levels subsequent to the second time.

7. The method of claim 4, wherein the buried explosive device is an improvised explosive device (TED).

* * * * *